Aug. 23, 1960 S. APOSTOLESCU 2,950,074
HELICOPTER
Filed Oct. 15, 1956 4 Sheets-Sheet 1

INVENTOR.
STEFAN APOSTOLESCU
BY
Elw. S. Higgins
ATTORNEY

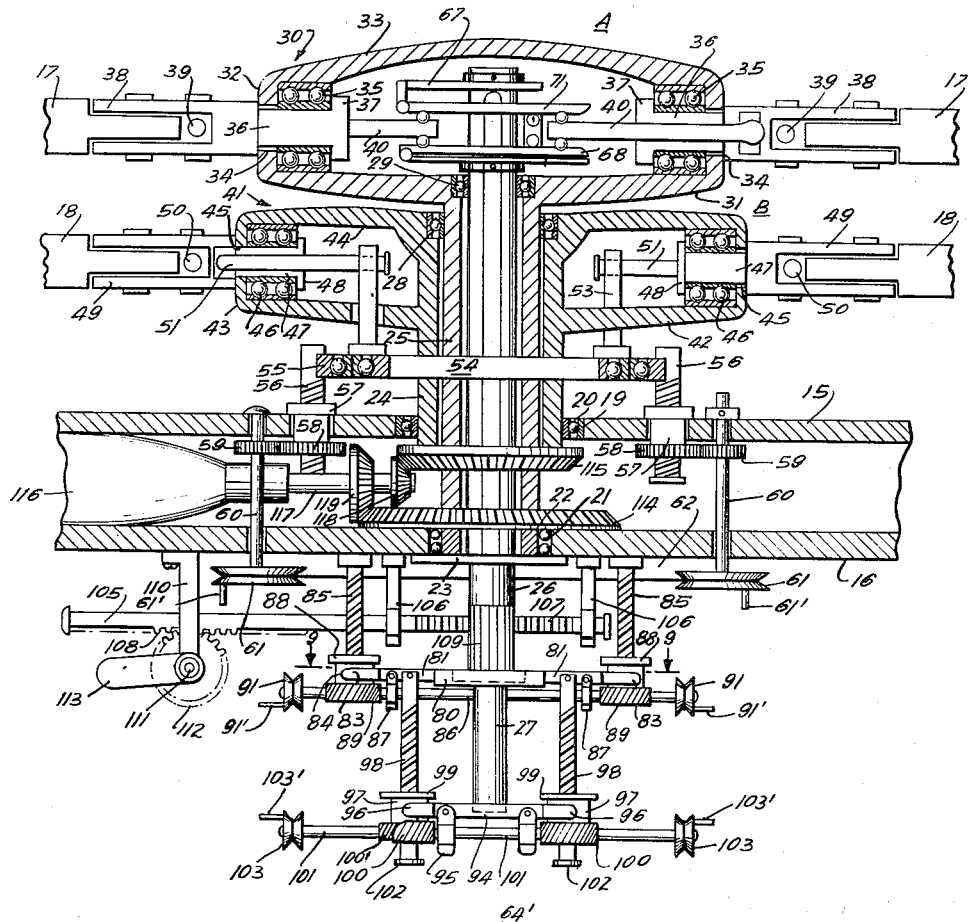

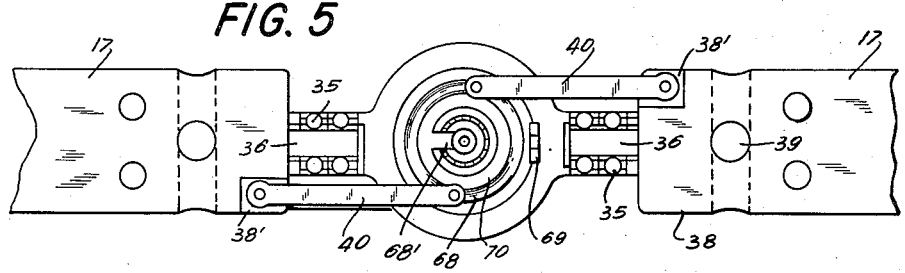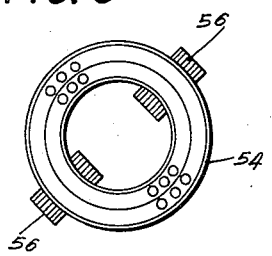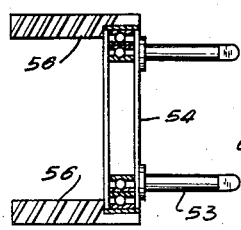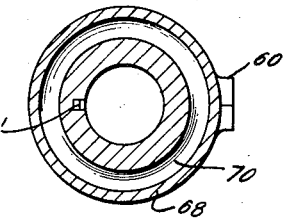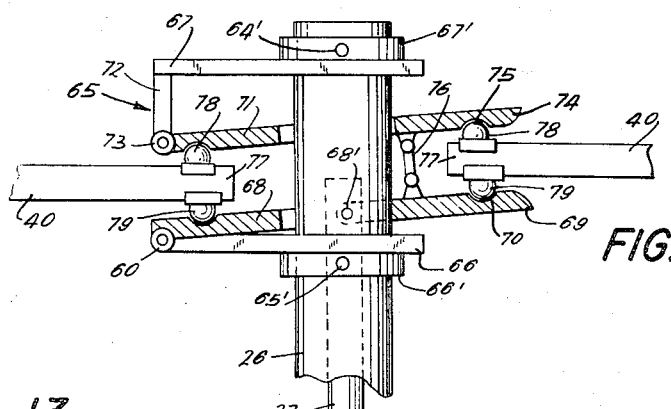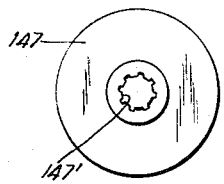

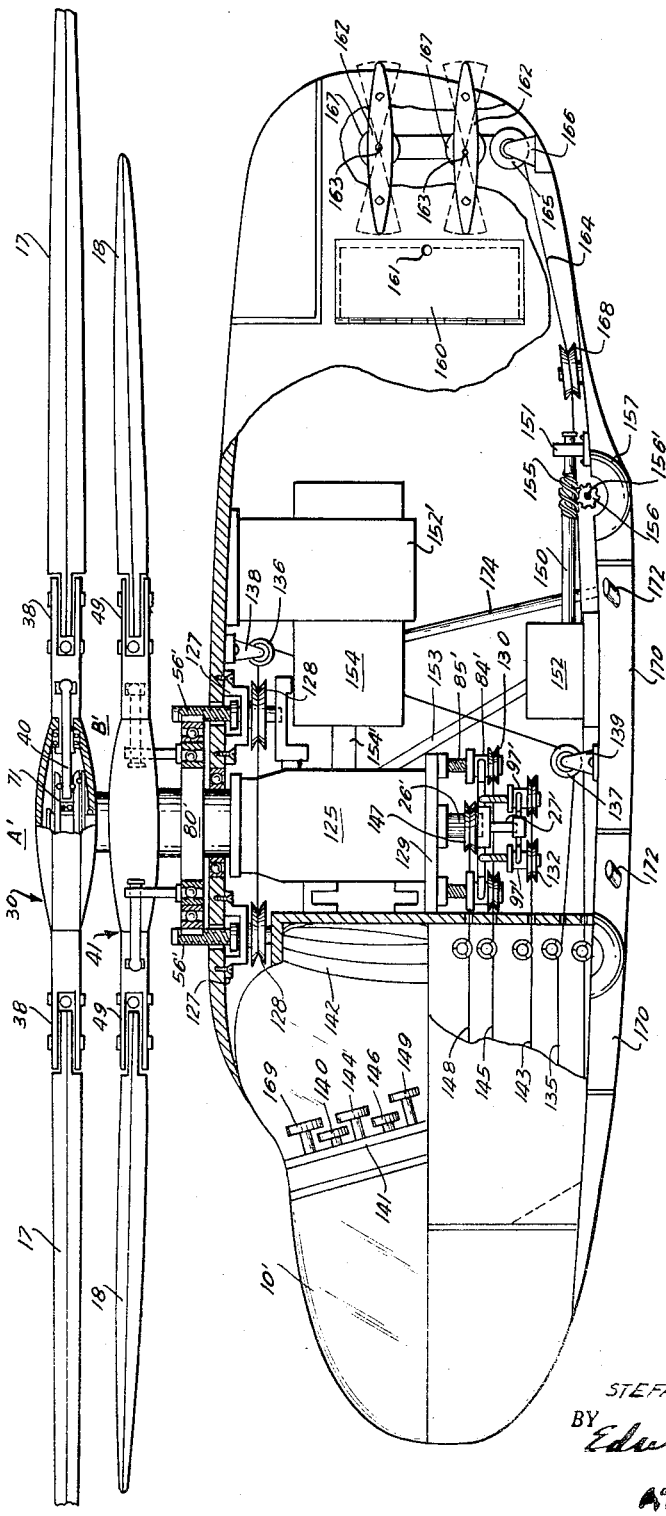

United States Patent Office 2,950,074
Patented Aug. 23, 1960

2,950,074

HELICOPTER

Stefan Apostolescu, 415 W. 35th St., New York, N.Y.

Filed Oct. 15, 1956, Ser. No. 616,055

16 Claims. (Cl. 244—17.23)

This invention relates to helicopters and more particularly to a helicopter with coaxial rotors providing the sustentation and propulsion in the air.

The primary object of the present invention is to provide a new and combined form of sustentation and propulsion means for helicopters, which means embodies especial advantages in the use thereof in helicopters wherein the sustentation is principally provided by one rotor, the other rotor being used for propelling and directing the helicopter in the air.

Another object of the invention is to provide an improved coaxial helicopter having coaxial superposed rotors of different blade radius.

Still another object of the invention is to provide a helicopter with coaxial rotors of different diameters, one rotor turning faster than the other rotor, the faster rotor giving the most or more than 60/100 sustentation for the helicopter in the air.

A further object of the invention is to provide an efficient reliable and simple control system for the helicopter rotor system and to provide means for controlling and carrying the angle of the blades separately or together in each rotor, and for controlling the cyclic pitch for propulsion, and to provide means for directing the helicopter in the air through the same controls.

Another object is to provide improved means for steering the aircraft.

Still another object of the invention is to provide a helicopter that can be adapted to travel in the air as a helicopter, or over the water and that is readily convertible for use on land such as an automobile.

A specific object of the invention is the provision of an efficient system for controlling and imparting the cyclic incidence change in the blades for a helicopter as is necessary for propulsion in combination with a rotor means.

For further comprehension of the invention and of the objects and advantages thereof reference will be had to the following description and accompanying drawings in which Fig. 1 is a top plan view of a helicopter embodying the invention.

Fig. 4 is a view in vertical section, on a line and plane passing vertically through the axis of rotation of the rotor units, on an enlarged scale.

Fig. 5 is a detail top plan view of the camming mechanism of the top rotor.

Fig. 6 is a top plan detail view of the swash plate.

Fig. 7 is a sectional view taken through the center of Fig. 6.

Fig. 8 is a top plan view of one of the camming plates of the top rotor.

Fig. 9 is a cross-sectional view taken on the plane of the line 9—9 of Fig. 4, on an enlarged scale.

Fig. 10 is a fragmentary diagrammatical side elevational view of the mechanism for changing the cyclic pitch of the blades of the top rotor, on an enlarged scale.

Fig. 11 is a view similar to Fig. 10 but showing the parts in section.

Fig. 12 is a side elevational view of a helicopter embodying a modification of the invention, parts being shown in section and parts being shown broken away.

Fig. 13 is a detail face view of a pulley.

Fig. 14 is a disassembled side elevational view of the pulley and shaft.

Figure 1:
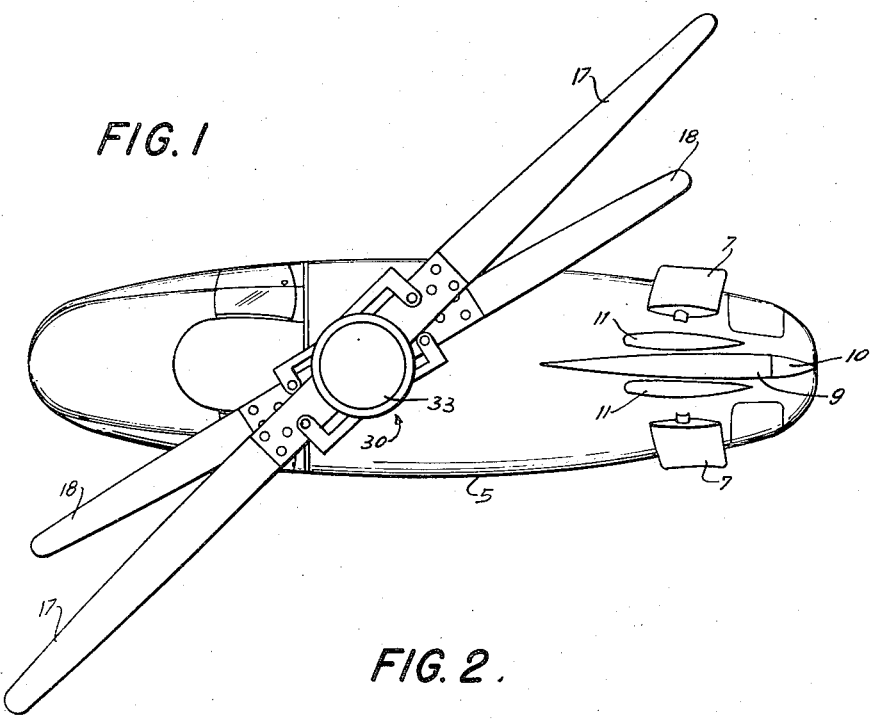
Figure 2:
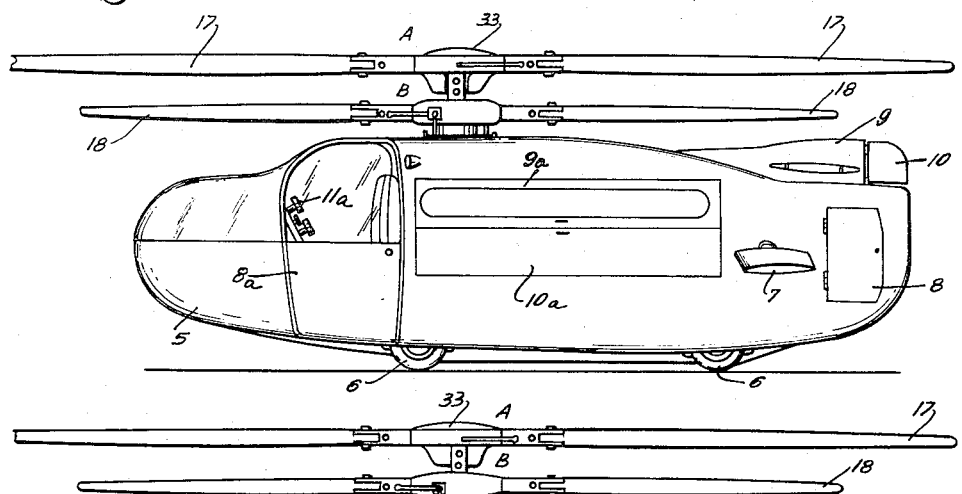
Fig. 2 is a side elevational view thereof.
Figure 3:
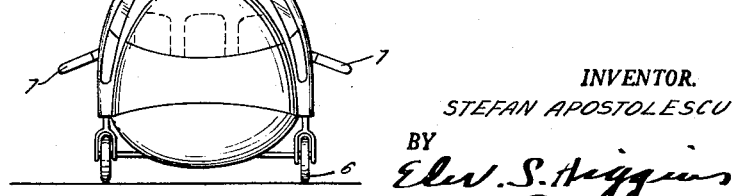
Fig. 3 is a front elevational view thereof.

I contemplate using my improved rotor units in a helicopter of the coaxial type as shown in Figs. 1 to 3, inclusive, comprising a fuselage 5, provided with landing gear wheels 6, and is provided with a suitable tail assembly shown as horizontal ailerons or stabilizers 7, airfoils 8, a vertical stabilizer 9, rudder 10 and horizontal stabilisers 11. A door 8a is provided at each side at the front and has a glass panel. Operating hand wheels 11a are mounted in the pilot's compartment.

Referring particularly to Fig. 4 for the description of the rotor units, the numeral 15 indicates a small upper section or shelf of the fuselage 5, the number 16 indicating a similar lower shelf of the fuselage for supporting the rotor units and associated parts. This portion of the fuselage serves as a mounting for the revolvable rotors of a propulsion or rotor unit, which consists in the main of two blade rotors, one of which rotors is generally denoted A and the other of which rotors is generally denoted B. The rotor A is an upper rotor and the rotor B is a lower rotor, and each of them is mounted on the same axis as its axis of rotation. Each rotor is comprised generally of two blades of the airfoil type and the rotor A has associated with it cyclic pitch control or operating means for the pair of blades. The rotor B has associated with it a swash plate or disk which regulates the angle of the blades along their revolving path, no cyclic pitch control being associated with the rotor B. Rotor A has two blades each denoted 17, and the rotor B has two blades each denoted 18. The rotors A and B rotate oppositely, one rotor rotating in a clockwise direction and the other rotor rotating in a counterclockwise direction. In both rotors, the blades are supported so that the blunt or usual leading edge is facing in the direction in which the propeller is moving.

The shelf section 15 of the fuselage is formed with an opening 19 and supported in said opening in the usual manner is a ball bearing assembly 20. The lower fuselage shelf 16 is also formed with an opening 21 and supported in said opening in the usual manner is a ball bearing assembly 22. A plate 23 is secured to the lower shelf section 16 below the opening 21. The ball bearing assemblies 20 and 22 are axially concentric, that axis being vertical, normally in action. The ball bearing assemblies together with the fuselage shelves 15 and 16 support concentrically an outer rotatable sleeve or shaft 24 of cylindrical shape, and an inner concentric sleeve or cylindrical shaft 25, and concentrically within the shafts 24 and 25 a control tube 26 and concentrically within tube 26 an actuating rod 27.

The inner rotatable shaft 25 is rotatably mounted by the ball bearing assembly 22 at its lower end supported in the lower fuselage shelf section 16 and by a ball bearing assembly 28 at the top of the outer shelf 24. The control tube 26 is rotatably mounted by a ball bearing assembly 29 at the top of the inner shaft 25.

A hollow drum 30 is formed integrally on the top of the inner shaft 25. The drum has a bottom wall 31, a side wall 32 and a curved top wall 33. The side wall of the drum is provided with opposed openings 34. A ball bearing unit 35 is positioned in a recess in the drum in each side wall 32 around the opening 34 therein. Each of the ball bearing units supports oscillably therein one of the oscillable horizontal axles 36, of which there are two. Each of the blade axles 36 is cylindrical and has an interior integral flange or shoulder 37 which absorbs radial or centrifugal outward pull of the associated blade in rotation, of the rotor. Each of the axles 36 has exteriorly of the drum a bifurcated extension arm 38 and each extension arm has formed therewith and assembled therewith a universal joint 39 for the airfoil or propeller blade 17 of the upper rotor A. Furthermore each of the axles 36 has interiorly of the drum a rod 40 having one end extending along the axles and into a recess 38' in the extension arm 38 where it is pivotally connected to the extension arm (see Fig. 5). The other end protrudes beyond the flanged end of the axle into the drum. This rod is a so-called pitch control rod or element.

A concentric drum 41 is integrally formed on the upper end of the outer shaft 24 below the drum 30. The drum 41 has a bottom wall 42, a side wall 43 and a domed top wall 44. The side wall 43 is formed with opposed openings 45 formed therein and supported inside the side wall concentrically with said openings 45 are ball bearing units 46, 46. Each of the ball bearing units 46 supports oscillably therein one of the oscillable horizontal axles 47, of which there are two. Each of the blade axles 47 is cylindrical and has an interior integral flange or shoulder 48 which absorbs radial or centrifugal outward pull of the associated blade in rotation of the rotor B. Each of the axles 47 has exteriorally of the drum a bifurcated extension arm 49 and each extension arm has formed therewith and assembled therewith a universal joint 50 for the airfoil or propeller blade 18 of the lower rotor B. Each of the axles 47 has interiorly of the drum a rod 51 having one end extending along the axle 47 and into a recess 49' in the extension arm 49 where it is pivotally connected to the extension arm. The other end protrudes beyond the flanged end of the axle into the drum. The joint 50 of each blade 18 is preferably such that the blade is fully articulated, that is such that the connections of the blades 18 to their axles 47 comprise flapping and lead-lag pivots. The support of each blade 18 is such as to limit the inclination of the blade to the axis of its supporting shaft in the rotor so that there will not be in action interference of the rotors, one with the other.

It is contemplated that the blades of each unit, as described, may be fully articulated, or partly articulated, to swing in either or both planes, or it may be fixed firmly to its blade axle 36 or 37 as the case may be, and that these connections are preferably such that the blades in rotation will operate as blades of rotary blade sustenated aircraft, usually operate, and that they may be so fixed, to their said axles in any manner which may prove most suitable for any particular construction, and in accordance with the specific design and its desired characteristics in flight, and that this may be in accordance with any known construction of rotors for such purpose.

The rod 51 of the axle 47 of each blade 18 has its inner protruding end in the drum 41 supported on an upright vertical bracket post 53 which is supported on a rotatable swash device comprising an inner ring 54 fixed to the outer sleeve or shaft 24 and rotatable therewith and an outer stationary ring 55 fastened to a vertically movable screw 56 extending through and in threaded engagement with the threads of an internally screw-threaded bushing 57 rotatably supported by and extending through an opening in the upper fuselage shelf section 15. A spur gear 58 is formed on the lower end of the bushing 57 and is in mesh with a gear 59 on a vertical shaft 60 rotatably mounted and supported by the upper fuselage shelf section 15 adjacent the bushing 57. Shaft 60 extends through an opening in the lower fuselage shelf section 16 and a pulley 61 fastened to its lower end is rotated by means of a handle 61'. The pulleys are driven in unison by means of a cable 62 trained therearound, the cable being driven by any suitable mechanism not shown.

The upper end of the tube 26 extends through and supports in the drum 30 a camming disk assembly indicated generally at 65 in Fig. 10. This disk assembly comprises a lower bracket member 66 and an upper bracket member 67. Both bracket members encircle the tube and extend to one side thereof. Bracket member 67 is fixed to the tube 26 by means of a fastening member 64' passing through a collar 67' on the bracket and through the tube. A fastening member 65' passing through a collar 66' on bracket 66 fastens said latter bracket to the tube. A lower perforated camming disk 68 is hingedly connected to the outer end of the lower bracket member 66 as indicated at 60'. The camming disk 68 encircles the tube with its free end 69 on the opposite side thereof. An extension 68' on the inner periphery of the disk 68 is hingedly connected to the actuating rod 27 adjacent its top end. A circular groove or track 70 is formed in the upper surface of disk 68 adjacent its periphery. An upper perforated camming disk 71 is hingedly connected to a depending extension 72 on the upper bracket member 67 as indicated at 73. Disk 71 encircles the tube with its free end 74 on the opposite side thereof. A circular groove or track 75 is formed on the lower surface of the upper disk 71. The disks 68 and 71 are tied together by a connecting member 76 hinged at both ends to the disks so that both disks move in unison. The inner protruding ends 77 of the rods 40 are interposed between the ends of the opposed lower and upper disks 68 and 71, respectively, and said ends carry upper and lower ball bearings 78 and 79, respectively, for running in the respective tracks 75 and 70 formed in the disks 71 and 68.

The bottom end of tube 26 rests on a flanged plate 80 supported by opposed arms 81 having forked inner ends 82 fastened to the flange plate and having forked outer ends 83 partly encircling internally screw threaded bushings 84 mounted on depending posts 85 having external screw threads. An elongated shaft 86 extends parallel to the arms 81 and is supported in brackets 87 secured to said arms 81. The bushings each has a flange 88 at its top end and a worm gear 89 on its bottom end. Shaft 86 extends alongside the worm gears 89 and is formed with worms 83 meshing with the worm gears 89. A pulley 91 is fastened to each end of the shaft 86 and a handle 91' extends from each pulley for manually turning the pulley and shaft.

The rod 27 extends downwardly below the end of tube 26 and rests on a plate 94 supported by brackets 95. Plate 94 has lateral forked arms 96 which partly encircle bushings 97 supported on posts 98 secured to and depending from the arms 81 thereabove. Each bushing 97 has an upper flange 99 and a worm gear 100 on its bottom end.

An elongated shaft 101 extends perpendicularly to the posts 98 passing the worm gears 100 at which points the shaft is formed with worms 100' meshing with the worm gears. The bottom ends of the threaded posts 98 are formed with heads 102 to limit downward movement of the bushings thereon. A pulley 103 is fastened to each end of the shaft 101 and a handle 103' extends from the pulley for turning the pulley and shaft.

An elongated rack bar 105 extends horizontally and perpendicularly to the tube 26 and is supported in such position by brackets 106 depending from the lower fuselage shelf section 16. The bar is square in cross-section and is formed on one surface thereof with rack teeth 107 adjacent its inner end where it passes the tube 26 and with rack teeth 108 on an adjacent surface adjacent its outer end. The bottom end of the tube 26 is formed with elongated teeth 109 meshing with the teeth 107 on the rack bar for manually turning said tube. A bracket 110 secured to the lower fuselage shelf section 16 and depending therefrom supports a rotatable shaft 111 on which is fastened a ratchet wheel 112 meshing with the teeth 108 on the rack bar. A lever 113 secured to the shaft 111 is adapted to turn the ratchet wheel for sliding the rack bar, and turn the tube in any desired direction.

The inner shaft 25 has fixed on its lower end a bevel gear 114. The outer shaft 24 has fixed on its lower end a bevel gear 115 closely spaced above the bevel gear 114.

An engine 116 is shown supported between the fuselage shelf sections 15 and 16 with a drive shaft 117 extending toward and positioned between the bevel gears 114 and 115. A small bevel gear 118 is fixed on the extreme end of the drive shaft and another bevel gear 119 of slightly larger dimensions is fastened to the shaft inwardly of the outer bevel gear 118. Bevel gear 118 is in continuous mesh with bevel gear 115 for turning the sleeve or shaft 24 and rotor B in one direction, while bevel gear 119 is in mesh with the bevel gear 114 on the shaft 25 for turning the top rotor A, in the opposite direction.

The rotor blades are tied to the drums and are carried around thereby. The rods or arm members 40, 51 of the blades with their ball bearings carried thereby will roll over the flat face of the camming disk 68 and the blades will maintain a fixed angle of incidence of the blades. This position is used only during the raising of the helicopter or when it is kept in the air in a stationary position.

An important feature of the present invention is the improved means for changing the angle of pitch or the angle of incidence of the rotor blades 17. For this purpose, the inner face of the rods 40 of the bearing extension members 38 are positioned between the disk members 68 and 71 with their ball bearings 78 and 79 in the tracks 75 and 70, respectively, so that when the drums are rotated, the free ends of the rods with the ball bearings carried thereby will roll over the flat face of the camming disk members 68 and 71. When it is desired to change the angle of incidence or pitch of the blades, the camming disk 68 is actuated or tilted. The mechanism for actuating the camming disk 68 includes the rod 27 connected to said disk 68 as indicated at 68'. When the rod is raised the disk 68 will be tilted on its hinge 60 and due to the rigid connection 76 the upper disk 71 will simultaneously be tilted, on its hinge 73. The bar 27 is raised by means of the plate 94 connected to the bushings 97 which ride up on the screw threaded posts 98. The bushings are turned by the shaft 101 which is driven by the cable 104 passing around the pulleys 103. The shaft 86 is simultaneously rotated by the cable 104 thereby moving bushings 84 upwardly on the threaded posts 85 which movement is imparted to the plate 80 carrying the tube 26 upwardly simultaneously with the upward movement of the actuating rod 27. The tube 26 raises the camming disk assembly 65 upwardly with it.

In operation, the helicopter is raised to the necessary altitude by tilting the blades 17, 17 and 18, 18 to a fixed angle, for example 8°, and by rotating the rotors A and B by means of the engine 116 which drives the bevel gears 118 and 119 for turning the bevel gears 114 and 115, respectively. The blades 18, 18 are tilted to a fixed angle by turning the pulleys 61 through one of the handles 61', which in turn rotates the gears 59 and through gears 58 and bushings 57 raise the threaded posts 56 upwardly. Upward movement of the posts 56 carries the swash plate 54 upwardly which in turn carries the brackets 53 upwardly for turning the axles 51 of the blades 18, 18 to fixed position.

The blades 17, 17 of the top rotor A are tilted to fixed position by turning the pulleys 91 by means of one of the handles 91' whereby the shaft 86 rotates the gears 89 on bushings 84 which raise the posts 85 carrying the plate 80 therealong. Plate 80 moves tube 26 upwardly and at the top of the tube the camming disk assembly 65 is moved upwardly and the camming disk 68 moves the axles 40 upwardly thereby tilting the blades 17, 17 to a fixed angle.

When the helicopter has reached the necessary altitude, it is propelled in a horizontal flight by imparting a cyclic pitch to the blades 17, 17 of the top rotor A.

This is accomplished by raising the bar 27 upwardly by turning the pulleys 103 through one of the handles 103' in order to turn the shaft 201. Shaft 201 turns gears 100 on bushings 97 which ride up along the posts 98 carrying the plate 94 therealong. Plate 94 in turn lifts the bar 27 upwardly. At its upper end the bar is fastened to the lower camming disk 68 at 68' so that said camming disk is tilted upwardly around its hinge 60 and due to the rigid connection 76, the upper camming disk 71 is also simultaneously tilted to an angle such as shown in Fig. 10. When the camming disks are thus tilted and the rods 40 are carried around in the grooves 70 and 75 in their opposed faces, the blades 17, 17 flap or feather driving the helicopter horizontally.

When the aircraft is tilted, both rotors A and B serve to propel the aircraft horizontally.

In order to steer the helicopter in the desired direction, the complete camming disk assembly 65 is rotated collectively or bodily to the desired position whereby the cyclic pitch of the blades is displaced. This is done by turning the tube 26 by means of the bar 105 through the lever 113. The bar 105 is in mesh with the teeth 109 on the tube 26, thereby rotating the tube. The camming disk assembly 65 is fastened to the top of the tube and rotation of the tube is imparted to the camming disk assembly thereby turning the camming disks 68 and 71 collectively so as to displace the cyclic pitch of the blades.

The aircraft may also be steered by establishing a differential between the pitch of the blades in the rotor A and the pitch of the blades in the rotor B.

In the modified helicopter shown in Fig. 12, the construction of the rotors A' and B' are similar to the rotors A and B of the form of Fig. 1. In this modified form, however, the shafts, gears, tube and rod for actuating the rotors are encased in a housing 125 which extends downward below the top of the fuselage 10'. The upstanding screws 56' for supporting the swash plate or disk 80' are supported by brackets 127 secured to the under surface of the fuselage and are rotated by pulleys 128 fastened to the lower ends thereof.

The screw threaded posts 85' mounting the bushings 84' are fastened to a flange 129 formed on the bottom of the housing 125. Pulleys 130 are fastened to the lower end of the bushings 84'. Furthermore, the bottom of the bushings 97' are provided with pulleys 132 in place of the worm gears. The pulleys 128 are turned by a cable 135 trained therearound and around pulleys 136 and 137 at the top and bottom respectively of the fuselage. The pulleys are supported on brackets 138 and 139, respectively. The cable is actuated by a wheel 140 disposed on a panel 141 in front of the pilots seat 142. A similar cable 143 is trained around the pulleys 132 for raising the cam actuating rod 27'. Cable 143 is connected to a wheel 144 on the panel 141. Another cable 145 is trained around the pair of pulleys 130 for raising the tube 26', which cable is connected to a wheel 146 on panel 141. A pulley 147 fixed on the bottom end of tube 26' is actuated by a cable 148 trained therearound, which cable is actuated by a wheel 149 on the panel 141, whereby the tube is turned and raised. Tube 26' is fixed to the pulley 147 by means of teeth 109' on the pulley engaging elongated teeth 109' on the tube 26'.

A shaft 150 supported by a bracket 151 on the bottom wall of the fuselage is connected through reduction gearing in a box 152 and shafting 153 to the gears in the housing 125 for rotation thereby. The gears in the housing are driven by the engine shaft 154'. The engine 154 is supported by a bracket 152' secured to the top wall of the fuselage. A worm 153 is fixed on the shaft 150, which worm meshes with a worm wheel 156 on the shaft 156' mounting the road wheels 157. By reason of this construction, the helicopter is adapted to be driven over the highway or road. Any suitable mechanism may be provided for steering the vehicle over the highway or road.

At the rear of the fuselage, an opening is formed in each side thereof which opening is closed by a hinged airfoil 160, the airfoil being provided with an inner handle 161 for manipulating the same. This airfoil is positioned in front of a pair of elevators mounted on shafts 163 for angular displacement to the positions shown in dash lines. The elevators are displaced by means of a cable 164 trained over a pulley 165 supported on a bracket 166 on the fuselage and trained over pulleys 167 around the pivot shafts 163 of the elevators. The cable extends over a pulley 168 to the panel 141 where it is actuated by a wheel 169.

Tanks 170 secured to the bottom wall of the fuselage supply the fuel through a supply pipe 171 to the engine 154. The tanks are provided with inlets 172.

The operation of the modified form of helicopter is similar to the form shown in Fig. 1. The blades 17, 17 and 18, 18 are tilted to a fixed angle by raising the bar 27' and tube 26' by means of the pulleys and cables. Cyclic pitch is imparted to the blades 17, 17, of the top rotor A' by raising the tube 26' through the pulleys and cable. Steering is controlled by turning the tube 26' by means of the pulley 147 and cable 148.

In all other respects, the modified form of helicopter shown in Fig. 12 is similar to the form shown in Figs. 1 to 11, inclusive, and similar reference numerals are used to indicate similar parts.

While I have illustrated and described the preferred embodiments of my invention, it will be understood that changes in details might be made without departing from the principle of the invention and I desire to be limited only by the state of the prior art and the appended claims.

I claim:

1. In combination with upper and lower propellers mounted for rotation about the same vertical axis and each having a plurality of blades mounted for pitch adjustment, means for changing the blade pitch of the lower propeller to a fixed angle, means for changing the blade pitch of the upper propeller to a fixed angle, means for changing the cyclic pitch of the upper blades including two opposed closely spaced disks encircling the axis of rotation of said upper propeller and rod members having one end in engagement with the opposed surfaces of the disks and the other end connected with the blades by means which translates rectilinear movement of the rods into rotary movement of the blades, means for raising and lowering the spaced disks and means for tilting the spaced disks to effect a pitch variation during each propeller revolution.

2. The means as described and claimed in claim 1 wherein the means for changing the blade pitch of the lower propeller to a fixed angle includes a movable swash disk, means for raising said swash disk including vertically supported screws, rotatable shafts operatively connected to said screws for raising the same, means for rotating said shafts, upright posts carried by the swash disk operatively connected to rods articulately connected to the blades of the lower propeller.

3. The means as described and claimed in claim 1 wherein the means for translating rectilinear movement of the rods into rotary movement of the blades includes a universal joint between each blade and its respective rod member, a vertically movable tube, spaced brackets fixed to the tube, hinge connections between the brackets and disks, said disks having opposed camming grooves encircling the axis of rotation of the propeller, ball bearings carried by the rods and movable in said grooves, and means for raising said tube.

4. The means as described and claimed in claim 1 wherein the means for changing the blade pitch of the lower propeller to a fixed angle includes a movable swash disk, means for raising said swash disk including vertically supported screws, rotatable shafts operatively connected to said screws for raising the same, means for rotating said shafts, upright posts carried by the swash disk operatively connected to rods articulately connected to the blades of the lower propeller, and wherein the means for translating rectilinear movement of the rods into rotary movement of the blades includes a universal joint between each blade and its respective rod member, a vertically movable tube, spaced brackets fixed to the tube, hinge connections between the brackets and disks, said disks having opposed camming grooves encircling the axis of rotation of the propeller, ball bearings carried by the rods and movable in said grooves, and means for raising said tube.

5. The means as described and claimed in claim 3 wherein the means for raising the tube includes a vertically movable plate supporting the bottom end of the tube, laterally extending arms on the plate, said arms having forked ends spanning vertically movable bushings, gears on said bushings, a rotatable shaft, worms on said shaft meshing with said gears, pulleys on the ends of the shaft and means for rotating said pulleys.

6. The means as described and claimed in claim 4 wherein the means for raising the tube includes a vertically movable plate supporting the bottom end of the tube, laterally extending arms on the plates, said arms having forked ends spanning vertically movable bushings, gears on said bushings, a rotatable shaft, worms on said shaft meshing with said gears, pulleys on the ends of the shaft and means for rotating said pulleys.

7. The means as described and claimed in claim 1 wherein the means for changing the cyclic pitch of the blades of the upper propeller includes a universal joint between each blade and its respective rod member, a vertically movable tube, spaced upper and lower brackets fixed to the tube, spaced disks hinged at one end to said brackets, a line connection between the disks at the other end thereof, said disks having opposed camming grooves encircling the axis of rotation of the propeller, ball bearings carried by the rod members and movable in said grooves, a rod slidable in said tube, means of connection between said slidable rod and the lower disk, means for raising said tube, and means for raising said slidable rod.

8. The means as described and claimed in claim 7 wherein the means for raising said slidable rod includes a plate member supporting the bottom end of the slidable rod, laterally extending arms on the plate, said arms having forked ends partially encircling vertically movable bushings, gears on said bushings, a rotatable shaft, worms on the shaft meshing with said gears, pulleys on the ends of the shaft and means for rotating said pulleys.

9. In an air craft, a fuselage having spaced shelf sections, a first rotor unit mounted on one of said shelf sections to rotate on a vertical axis and having air-foil blades each mounted in the rotor unit to have oscillation on an axis extending in the horizontal plane as substantially a radius of the circle about the axis of the rotor unit, each air-foil blade having a rod hingedly fixed therewith and forming an extension thereof, said rotor unit having vertically movable screws connected to the rods, and having rotatable shafts, intermeshing gears on the shafts and screws; each rotatable shaft having pulley means fixed thereto, a second rotor unit mounted on the other of the shelf sections of the fuselage on an axis co-incidental with the axis of the first rotor unit, the second rotor unit having air-foil blades each mounted in the said second rotor unit to have oscillation on an axis extending in the horizontal plane as substantially a radius of the circle about the axis of the rotor unit, each air-foil blade of the second rotor unit having a rod hingedly fixed thereto and forming an extension thereof radially of the oscillation of the air-foil blade, means for effecting a pitch variation in the latter airfoil blades during each propeller revolution, and means connected and for rotating the rotor units in opposite directions.

10. The air craft as defined in claim 9 wherein the means for effecting a pitch variation in the airfoil blades of the second rotor unit during each propeller revolution includes a vertically movable tube, spaced brackets fixed to the upper end of the movable tube, camming disks hinged at one end to said brackets, a straight member connecting said disks at the other end thereof, said disks encircling the axis of rotation of said propeller, a rod slidable in said tube, means of connection between the upper end of said rod and the lower camming disk and means for moving said rod.

11. A coaxial helicopter having upper and lower spaced rotors, each having a plurality of blades of different diameters, the upper blades being longer than the lower blades, the blades of the lower rotor rotating at a greater speed than the blades of the upper rotor, means to rotate the rotors in opposite directions, means to control the pitch angle of the blades of each rotor separately and variably, the blades of the lower rotor having only variable pitch control and the blades of the upper rotor having both varaible and cyclic pitch control, means to control the cyclic pitch of the upper rotor blades for propulsion, and means for steering the aircraft in the air.

12. The coaxial helicopter described and claimed in claim 11 wherein the steering means includes a vertically movable tube, brackets fixed to the upper end of the tube, spaced disks hingedly connected to the brackets at one end, a rigid connection between the disks at the other end, rods connected at one end to the disks and at the other end to the blades, whereby upon upward movement of the tube the blades are tilted, and means for rotating said tube including a manually slidable ratchet bar with teeth thereon, said tube having elongated teeth on the bottom end thereof in mesh with the teeth on the ratchet bar whereby upon movement of the bar the tube is rotated thereby bodily moving the disks around to the desired position for steering the aircraft.

13. The coaxial helicopter described and claimed in claim 11 wherein the steering means includes means for establishing a differential between the pitch of the blades of the upper rotor and the pitch of the blades of the lower rotor, said latter means including a vertically movable tube operatively connected to the blades of the upper rotor, means for raising said tube, a vertically movable swash disk operatively connected to the blades of the lower disk, and means for raising said swash disk.

14. A coaxial helicopter having upper and lower spaced rotors, each having a plurality of blades of different diameters, the upper blades being longer than the lower blades, the blades of the lower rotor rotating at a greater speed than the blades of the upper rotor, means to rotate the rotors in opposite directions, means to control the pitch angle of the blades of each rotor separately and variably, the blades of the lower rotor having only variable pitch control and the blades of the upper rotor having both variable and cyclic pitch control, and means to control the cyclic pitch of the upper rotor blades for propulsion, the means for controlling the pitch angle of the blades of the lower rotor including a movable swash disk, means for raising said swash disk including vertically supported screws, rotatable shafts operatively connected to said screws for raising the same, means for rotating said shafts, upright posts carried by the swash disk operatively connected to rods articulately connected to the blades of the lower propeller.

15. A coaxial helicopter having upper and lower spaced rotors, each having a plurality of blades of different diameters, the upper blades being longer than the lower blades, the blades of the lower rotor rotating at a greater speed than the blades of the upper rotor, means to rotate the rotors in opposite directions, means to control the pitch angle of the blades of each rotor separately and variably, the blades of the lower rotor having only variable pitch control and the blades of the upper rotor having both variable and cyclic pitch control, and means to control the cyclic pitch of the upper rotor blades for propulsion, the means for controlling the variable pitch of the blades of the upper rotor including rods connected through universal joints to said blades, a vertically movable tube, spaced brackets fixed to the tube, upper and lower disks encircling said tube, hinge connections between the brackets and disks, and means for raising said tube.

16. A coaxial helicopter having upper and lower spaced rotors, each having a plurality of blades of different diameters, the upper blades being longer than the lower blades, the blades of the lower rotor rotating at a greater speed than the blades of the upper rotor, means to rotate the rotors in opposite directions, means to control the pitch angle of the blades of each rotor separately and variably, the blades of the lower rotor having only variable pitch control and the blades of the upper rotor having both variable and cyclic pitch control, and means to control the cyclic pitch of the upper rotor blades for propulsion, the means for controlling the cyclic pitch of the blades of the upper rotor including rods connected through universal joints to said blades, a vertically movable tube, spaced upper and lower brackets fixed to the tube, spaced disks encircling said tube and hinged at one end to said brackets, a line connection between the disks at the other end thereof, said disks having opposed camming grooves encircling the axis of rotation of the propeller, ball bearings carried by the rod members and movable in said grooves, a rod slidable in said tube, means of connection between said slidable rod and the lower disk, means for raising said tube, and means for raising said slidable rod.

References Cited in the file of this patent

UNITED STATES PATENTS

| | | |
|---|---|---|
| 1,868,392 | Leffert | July 19, 1932 |
| 1,921,805 | Bordoni | Aug. 8, 1933 |
| 2,514,822 | Wolfe | July 11, 1950 |
| 2,563,731 | Masterson | Aug. 7, 1951 |
| 2,589,030 | Alde | Mar. 11, 1952 |